US007571561B1

(12) United States Patent
Garcia

(10) Patent No.: US 7,571,561 B1
(45) Date of Patent: Aug. 11, 2009

(54) DEPLOYABLE TRAFFIC SIGN

(75) Inventor: Guadalupe C. Garcia, Tijuana (MX)

(73) Assignee: Worldwide Safety of Nevada, Inc., Laguna Hills, CA (US)

( * ) Notice: Subject to any disclaimer, the term of this patent is extended or adjusted under 35 U.S.C. 154(b) by 105 days.

(21) Appl. No.: 11/600,001

(22) Filed: Nov. 15, 2006

Related U.S. Application Data

(60) Provisional application No. 60/737,151, filed on Nov. 15, 2005.

(51) Int. Cl.

| | |
|---|---|
| ***G09F 15/00*** | (2006.01) |
| ***G09F 15/02*** | (2006.01) |
| ***G09F 19/00*** | (2006.01) |
| ***G09F 1/08*** | (2006.01) |
| ***G09F 1/00*** | (2006.01) |
| ***E01F 9/00*** | (2006.01) |
| ***F16M 13/00*** | (2006.01) |
| ***F16M 11/38*** | (2006.01) |

(52) U.S. Cl. ........................ 40/606.15; 40/610; 40/613; 40/539; 40/124.08; 40/124.14; 40/124.09; 248/624; 248/158; 248/160; 248/170; 116/63 P; 116/63 R

(58) Field of Classification Search .............. 40/606.15, 40/610, 613, 539, 124.08, 124.14, 124.09; 248/624, 158, 160, 170; 116/63 P, 63 R; 428/34.1

See application file for complete search history.

(56) References Cited

U.S. PATENT DOCUMENTS

| | | | | |
|---|---|---|---|---|
| 735,486 | A | | 8/1903 | Fels |
| 2,525,728 | A | | 10/1950 | Sauer |
| 2,613,463 | A | | 10/1952 | Transue |
| 3,792,678 | A | | 2/1974 | Rowland |
| 4,019,271 | A | | 4/1977 | Latimer |
| 4,182,063 | A | | 1/1980 | Klosel |
| 4,548,379 | A | | 10/1985 | Seely et al. |
| 4,552,089 | A | | 11/1985 | Mahoney |
| 4,575,040 | A | * | 3/1986 | Seely ......................... 248/624 |
| 4,592,158 | A | | 6/1986 | Seely |
| 4,593,879 | A | | 6/1986 | Seely et al. |
| 4,619,220 | A | | 10/1986 | Seely et al. |
| 4,662,095 | A | | 5/1987 | Higgins |
| 4,691,892 | A | | 9/1987 | Grewe et al. |
| 4,694,601 | A | | 9/1987 | Dicke et al. |
| 4,747,515 | A | | 5/1988 | Kasher et al. |
| 4,977,697 | A | | 12/1990 | Genick |
| 5,340,068 | A | | 8/1994 | Sarkisian et al. |
| 5,488,792 | A | | 2/1996 | Kwok |
| 5,694,711 | A | | 12/1997 | Cowgill et al. |
| 5,725,186 | A | | 3/1998 | Hillstrom et al. |
| 5,729,926 | A | * | 3/1998 | Cowgill et al. ................ 40/610 |
| 5,732,911 | A | | 3/1998 | Kulp et al. |
| 5,829,178 | A | | 11/1998 | Hillstrom |
| 6,032,908 | A | | 3/2000 | Hillstrom et al. |

(Continued)

*Primary Examiner*—Paul N Dickson
*Assistant Examiner*—Syed A Islam
(74) *Attorney, Agent, or Firm*—Stout, Uxa, Buyan & Mullins LLP; Donald E. Stout

(57) ABSTRACT

A deployable temporary traffic sign system requires no roadside assembly, because the sign comprises a flexible sign panel which may be changed in size merely by folding one portion of the sign panel over a second portion of the sign panel about a crease line disposed therein. The sign itself is supported on a sign stand which is pivotally mounted to a support base.

16 Claims, 17 Drawing Sheets

U.S. PATENT DOCUMENTS

| | | | |
|---|---|---|---|
| 6,056,250 | A | 5/2000 | Hillstrom et al. |
| 6,430,855 | B1 | 8/2002 | Gertz et al. |
| 6,435,369 | B1 | 8/2002 | Poursayadi |
| 6,560,906 | B1 | 5/2003 | Hillstrom |
| 6,606,809 | B2 * | 8/2003 | Hillstrom et al. .............. 40/610 |
| 6,659,681 | B1 | 12/2003 | Kulp et al. |
| 6,688,028 | B2 | 2/2004 | Backe |
| 6,752,582 | B2 | 6/2004 | Garcia |
| 6,928,952 | B2 | 8/2005 | Garcia |
| 2005/0091895 | A1 | 5/2005 | Garcia |

* cited by examiner

DEPLOYABLE TRAFFIC SIGN

This application claims the benefit under 35 U.S.C. 119(e) of the filing date of Provisional U.S. Application Ser. No. 60/737,151, entitled Deployable Traffic Sign, and filed on Nov. 15, 2005, which application is expressly incorporated herein by reference.

BACKGROUND OF THE INVENTION

The present invention relates generally to traffic signs, and more particularly to traffic signs that can be deployed without assembly of the traffic sign at a desired display location.

Of major importance today, due to our society's dependence upon motorized transportation, is the continuing construction, repair, and maintenance of freeways, highways, and roads. Involved in all such construction, repair, and maintenance are traffic signs for placement on the roadside ahead of the job site, where motorists can be warned of the presence of road construction equipment, personnel, or hazardous conditions as they approach the work site. To provide motorists with such notification or warning, it is necessary that one or more traffic signs be displayed along the roadside, such signs being located well in advance of the road construction or repair project. One type of traffic sign that is commonly placed along the roadside is the so-called and art-recognized roll-up sign. Examples of prior art roll-up signs are described, for instance, in U.S. Pat. No. 4,019,271 (Laminer), U.S. Pat. No. 4,548,379 (Marketing Displays, Inc.), U.S. Pat. No. 4,694,601 (Dicke Tool Co.), and U.S. Pat. No. 5,732,911 (TrafFix Devices, Inc.). These prior art roll-up signs typically comprise a support stand, such as a one-piece base or a plurality of supporting legs coupled to a frame, and a reflective and flexible sign, which is attached to the frame.

A typical process for placing prior art roll-up traffic safety signs is to deliver a disassembled roll-up sign and support stand to a desired location along a roadside. A worker will then assemble the roll-up sign system and correctly place the sign so that it is properly displayed to passing motorists. Although attempts have been made to simplify this assembly process, most notably in the system disclosed in the '911 patent, present approaches still require delivery of a disassembled roll-up sign package to a desired location, followed by the exertion of manual labor, on-site, to assemble and place these roll-up signs. Thus, a first drawback of current roll-up signs is the required time and labor to assemble and place the signs. A second drawback is that the assembly task poses safety concerns to the worker, because the assembly process typically takes place along a roadside with passing vehicular traffic. Accordingly, it would be advantageous to have a roll-up sign system which could be deployed without the need for roadside assembly.

SUMMARY OF THE INVENTION

The present invention addresses the issues noted above by providing a deployable sign system requiring no roadside assembly, wherein a flexible sign panel is changed in size merely by folding one portion of the sign panel over a second portion of the sign panel about a crease line disposed therein, and the sign itself is supported on a sign stand which is pivotally mounted to a support base.

More particularly, in one aspect of the invention there is provided a traffic sign system which includes a sign comprising a flexible panel having a first larger size when deployed and having a second smaller size when not deployed. A mast is provided for supporting the sign, as well as a base for supporting the mast. Advantageously, the flexible panel comprises a folding line thereon, preferably comprising a crease which may be heat welded into the panel, so that a portion of the flexible panel may be folded upon another portion of the flexible panel, about the folding line, for transforming the sign from its first larger size to its second smaller size.

Preferably, a plurality of folding lines are disposed in the flexible panel, wherein at least two of the folding lines intersect one another. In a particularly preferred embodiment, there are four folding lines on the flexible panel, which is diamond-shaped in its first larger size, when vertically oriented, wherein the folding lines are arranged generally in a square so that each corner of the diamond-shaped flexible panel may be folded over a center portion of the panel, such that the panel is generally square in its second smaller size, when vertically oriented. A fastener is preferably provided for securing the sign in its second smaller size.

With regard to the mast, it is preferably pivotally attached to the base, and may be fixed in length, or may alternatively be comprised of a plurality of segments or members so that it is adjustable in length. The plurality of segments may either be telescopically arranged, or pivotally attached to one another, as desired.

In another aspect of the invention, there is provided a traffic sign which comprises a flexible panel having a first larger size when deployed and having a second smaller size when not deployed, wherein the flexible panel is adapted for display on a sign stand. The flexible panel comprises at least one folding line thereon, so that a portion of the flexible panel may be folded upon another portion of the flexible panel, about the at least one folding line, for transforming the sign from its first larger size to its second smaller size.

In yet another aspect of the invention, there is disclosed a method for deploying or undeploying a traffic sign disposed on a sign stand, wherein the traffic sign comprises a flexible panel having a first larger deployed size and a second smaller undeployed size. The method comprises a step of changing the size of the flexible panel by folding a portion of the panel over a second portion of the panel about a crease line disposed in the panel.

The invention, together with additional features and advantages thereof, may best be understood by reference to the following description taken in conjunction with the accompanying illustrative drawing.

DESCRIPTION OF THE PREFERRED EMBODIMENT

Figure 1A:
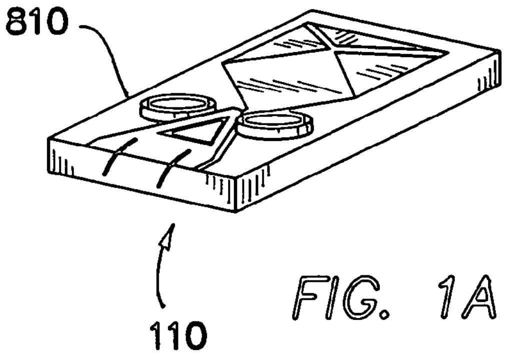
FIG. 1A is a perspective view of a deployable sign constructed in accordance with the present invention, in a stowed configuration.
Figure 1B:
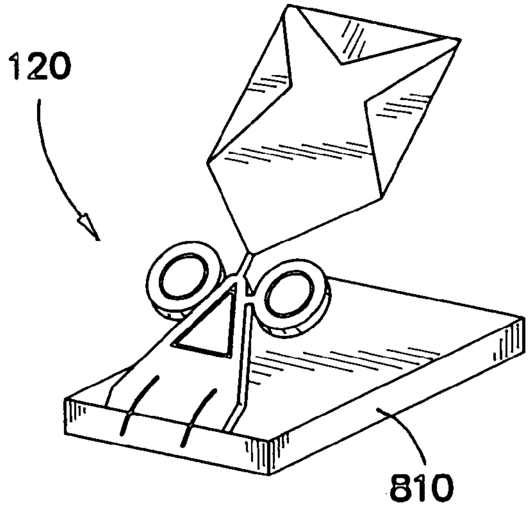
FIG. 1B is a perspective view similar to FIG. 1A showing the sign being deployed.
Figure 1C:
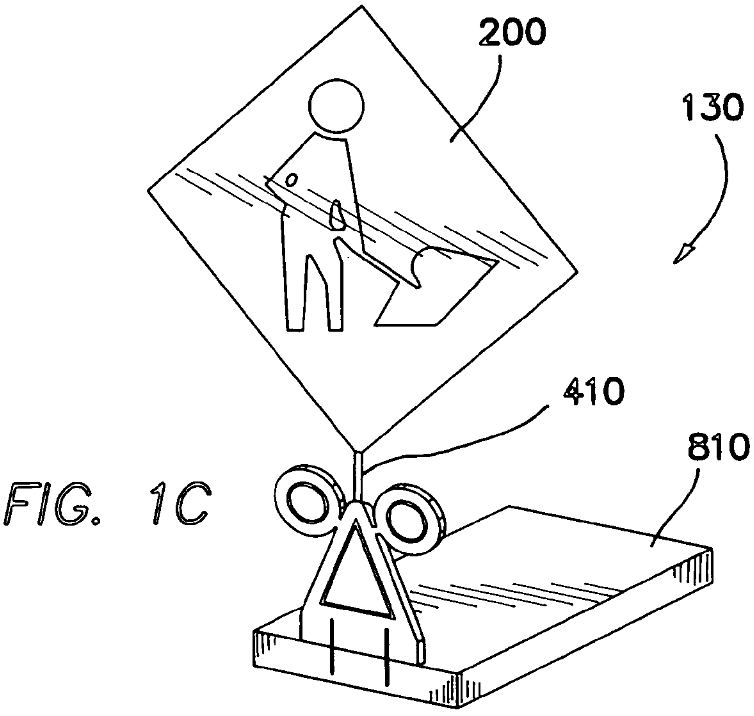
FIG. 1C is a perspective view similar to FIGS. 1A and 1B, showing the sign in a fully deployed configuration.

The present invention comprises a traffic sign and ways to deliver and/or place such a sign on a roadside or other desired location. The inventive traffic sign is a pre-assembled traffic sign that can be stored in a stowed configuration and displayed in a deployed configuration without assembly of its parts. Referring more particularly to the drawings, in FIGS. 1A-1C there is shown an example of an inventive sign constructed in accordance with the invention in a stowed configuration 110 (FIG. 1A), in a deploying configuration 120 (FIG. 1B), and in a fully deployed configuration 130 (FIG. 1C). In one possible embodiment, the traffic sign may be automatically deployed, for instance from a moving vehicle, as shown and described in co-pending U.S. patent application Ser. No. 11/041,184, filed on Jan. 21, 2005, commonly assigned herewith and herein expressly incorporated by reference.

Figure 2:
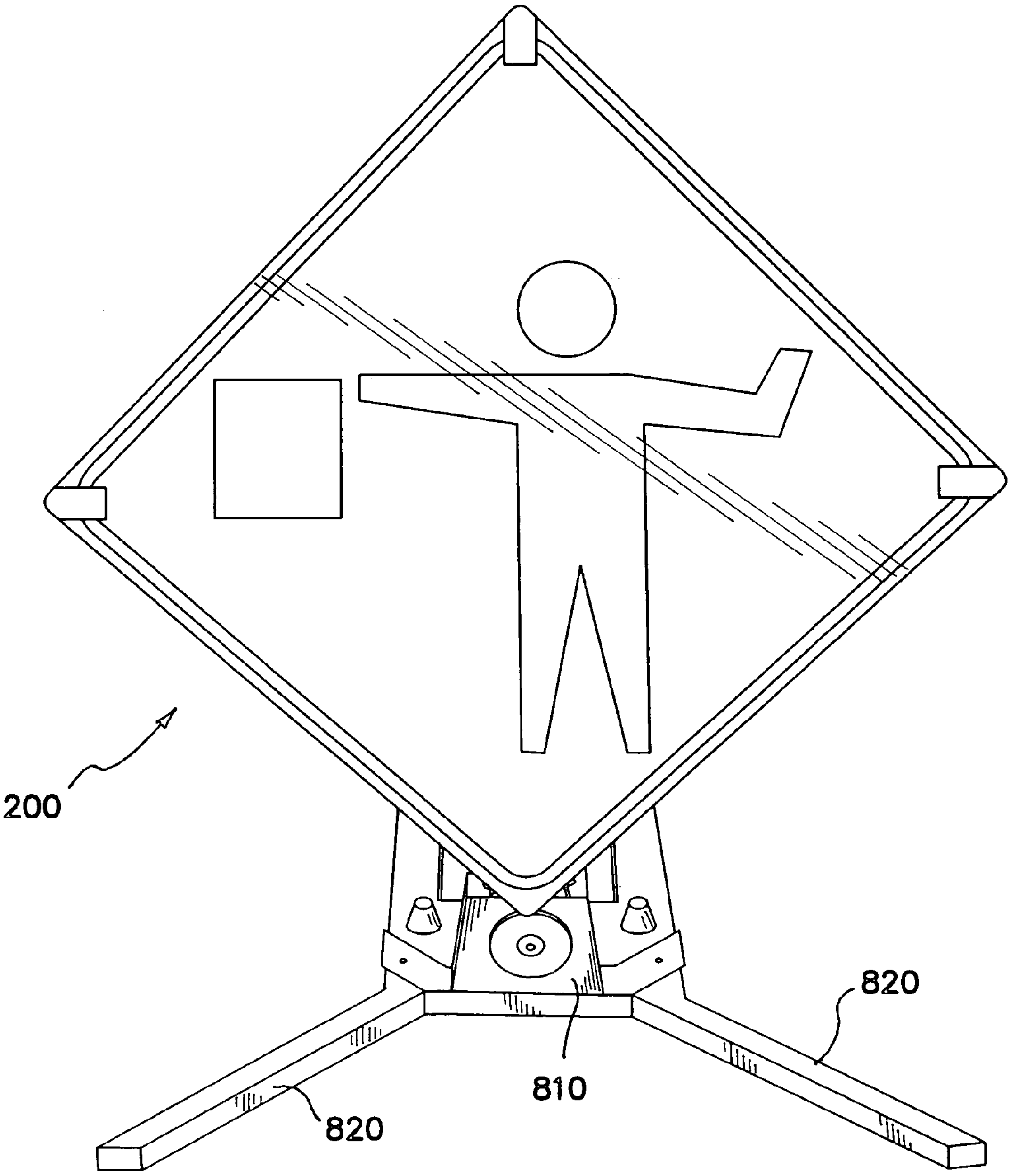
FIG. 2 is a front view of the sign system of FIGS. 1A-1C.

In the illustrated embodiment, the deployable sign is in a spring-loaded stored configuration, which is a configuration in which the sign itself is folded. From this folded configuration, the deployable sign can be unfolded to a full display size, as shown in FIG. 2. A pivotal connection exists between the support base and the deployable signage that is spring-loaded, as described in the '184 application, and serves to automatically bring up the sign and its mast to the deployed configuration.

The traffic sign can also be deployed manually by pulling up the deployable signage with respect to the support base and releasing a holding mechanism that holds the deployable signage in its stored orientation. Another way to manually deploy the traffic sign is by releasing another holding mechanism that holds the folded deployable traffic signage parallel to the support base and/or releasing a holding mechanism that holds the deployable signage in its stored position. Examples of both holding mechanisms may include a latch, click button, pin, a lock, VELCRO® hook and loop fasteners, or any other mechanisms that provide a holding function that can easily be undone.

Figure 3:
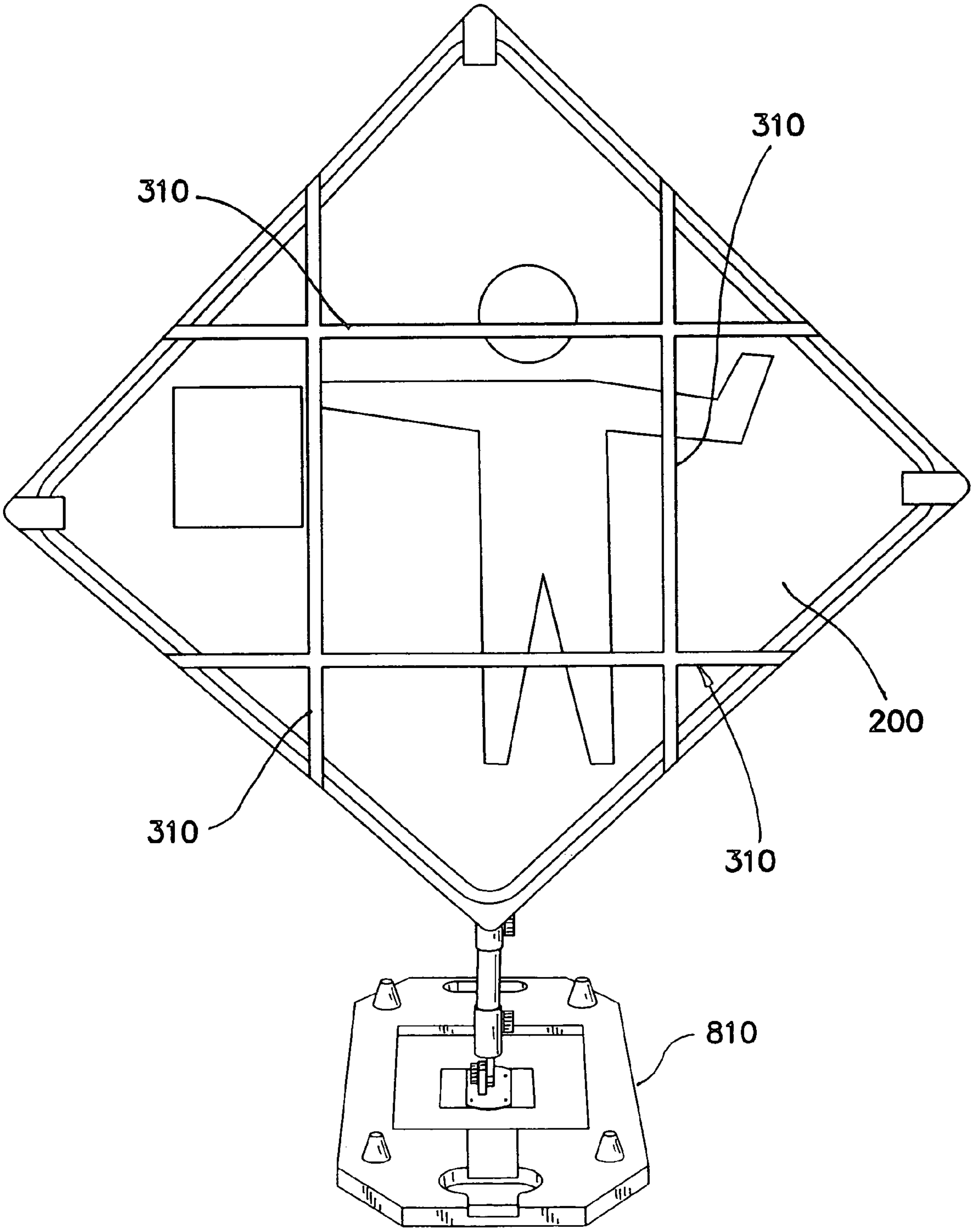
FIG. 3 is a front view similar to FIG. 2, showing an example of folding lines on the sign in accordance with a principle of the present invention.

Referring again to FIGS. 2-4, sign 200 may comprise a large flexible panel with a warning message or symbol which preferably conforms to federal or local traffic safety regulations. The sign 200 is typically a diamond-shaped sign displayed on a frame. The sign 200 of the present invention is preferably adapted to permit folding, as discussed above, by, for example, having folding lines 310 (FIG. 3) or folding areas on the sign which can facilitate the folding process and/or which are necessary to avoid damage to the reflective material on the sign. These folding lines 310 may comprise a crease either heat welded, pressed, stitched, or by any other known process for creating folding lines in a fabric, vinyl, or other pliable material for facilitating folding and deployment. The location of the folding lines is dependent upon the size of the frame on which the sign is secured, as might be imagined. The folding lines 310 in FIG. 3 are shown for illustrative purposes only, and it is preferred that these folding lines be formed to appear as an integral part of the sign so as not to distract passing motorists. The folding lines should be of the same coloring as the sign, transparent, or small in size.

Figure 4:
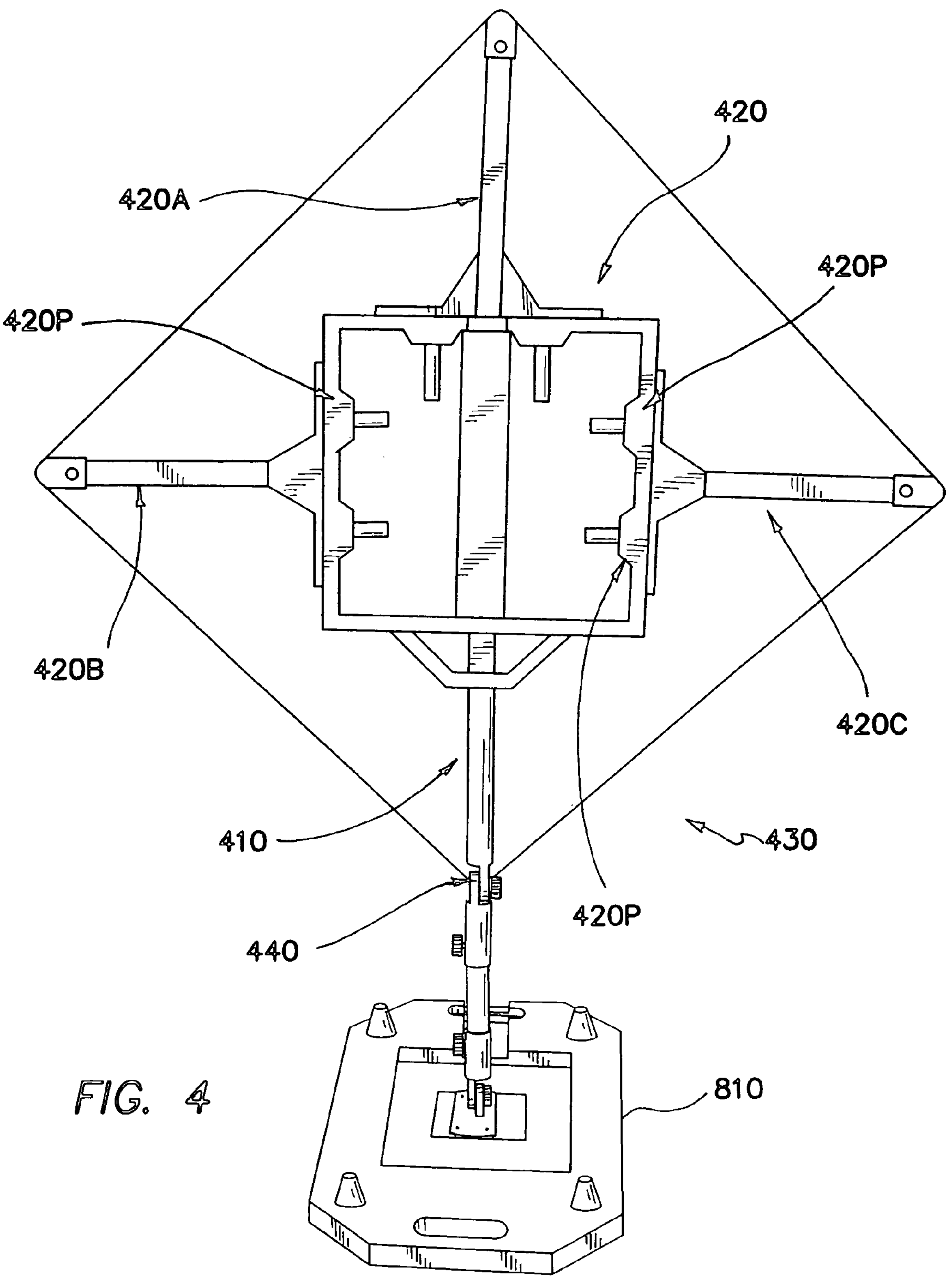
FIG. 4 is a rear view of the sign of FIGS. 1-3, wherein the sign is fully deployed.

A sign post or mast 410 has a frame 420 and flexible arms 420A, 420B, and 420C, which together create the frame 420 to which a sign 430 may be attached and spanned as shown in FIG. 4. Attachment mechanisms to attach and span the endpoints of the sign to the frame or flexible arms are common in the art of roll-up signs and the present invention is not limited to a particular choice of attachment hardware.

Figure 5:
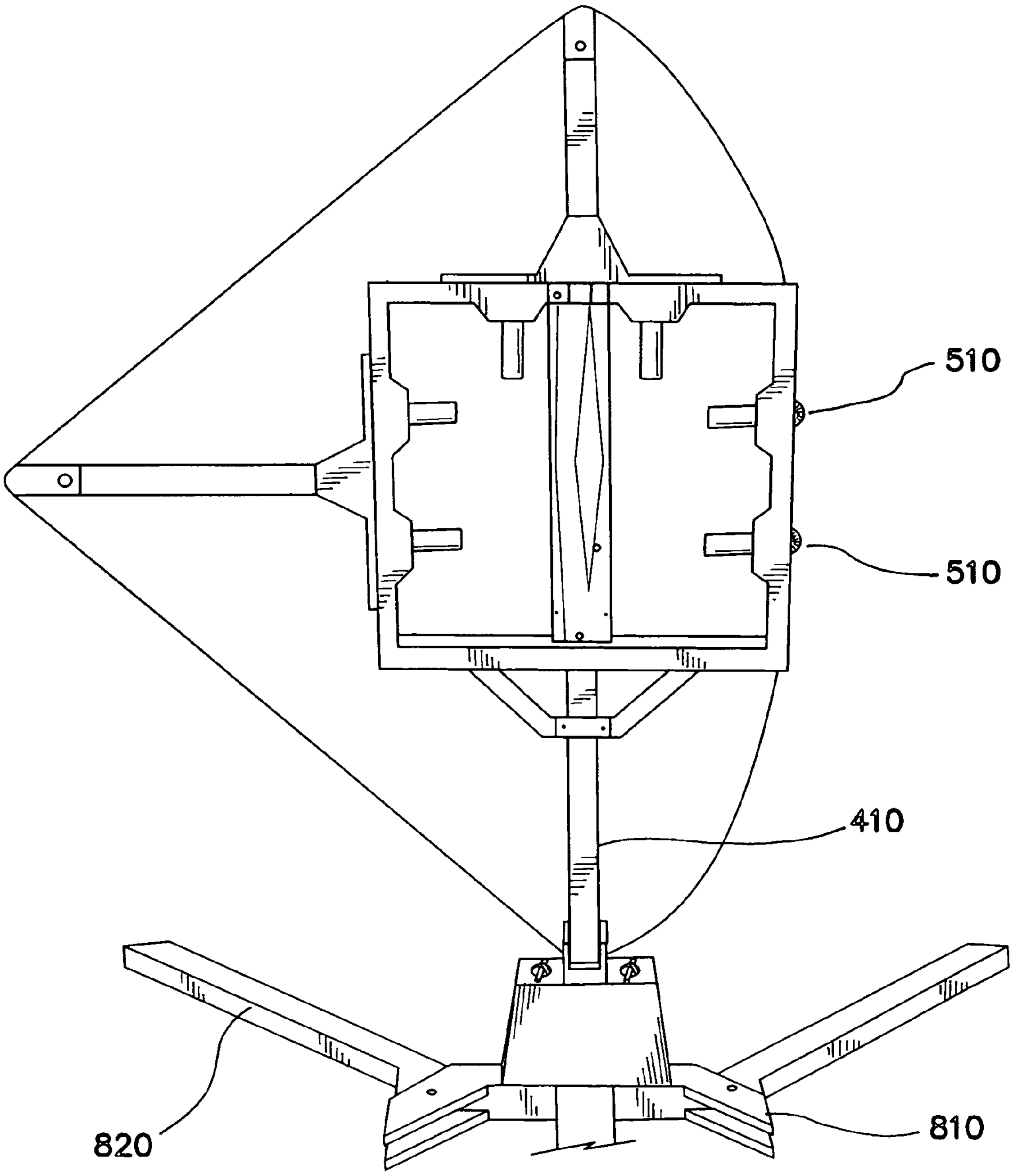
FIG. 5 is a rear view similar to FIG. 4, wherein the sign is being folded along the folding lines of FIG. 3.

In one inventive approach, folding of the sign is achieved by having each of the flexible arms 420A, 420B, 420C be capable of being independently folded around points 420P toward the center of the frame, as shown by example in FIG. 5. Flexible parts 510, which may comprise springs, spring blades, ribber, hinges, or the like, connect the flexible arms 420A, B, C to the frame 420. The endpoint of the flap of the sign that points downwardly, indicated by reference numeral 440 (FIG. 4), may either simply hang down or may alternatively be attached to the mast 410 with a magnet, button, VELCRO® hook and loop fasteners, or any other appropriate attachment means.

Figure 6:
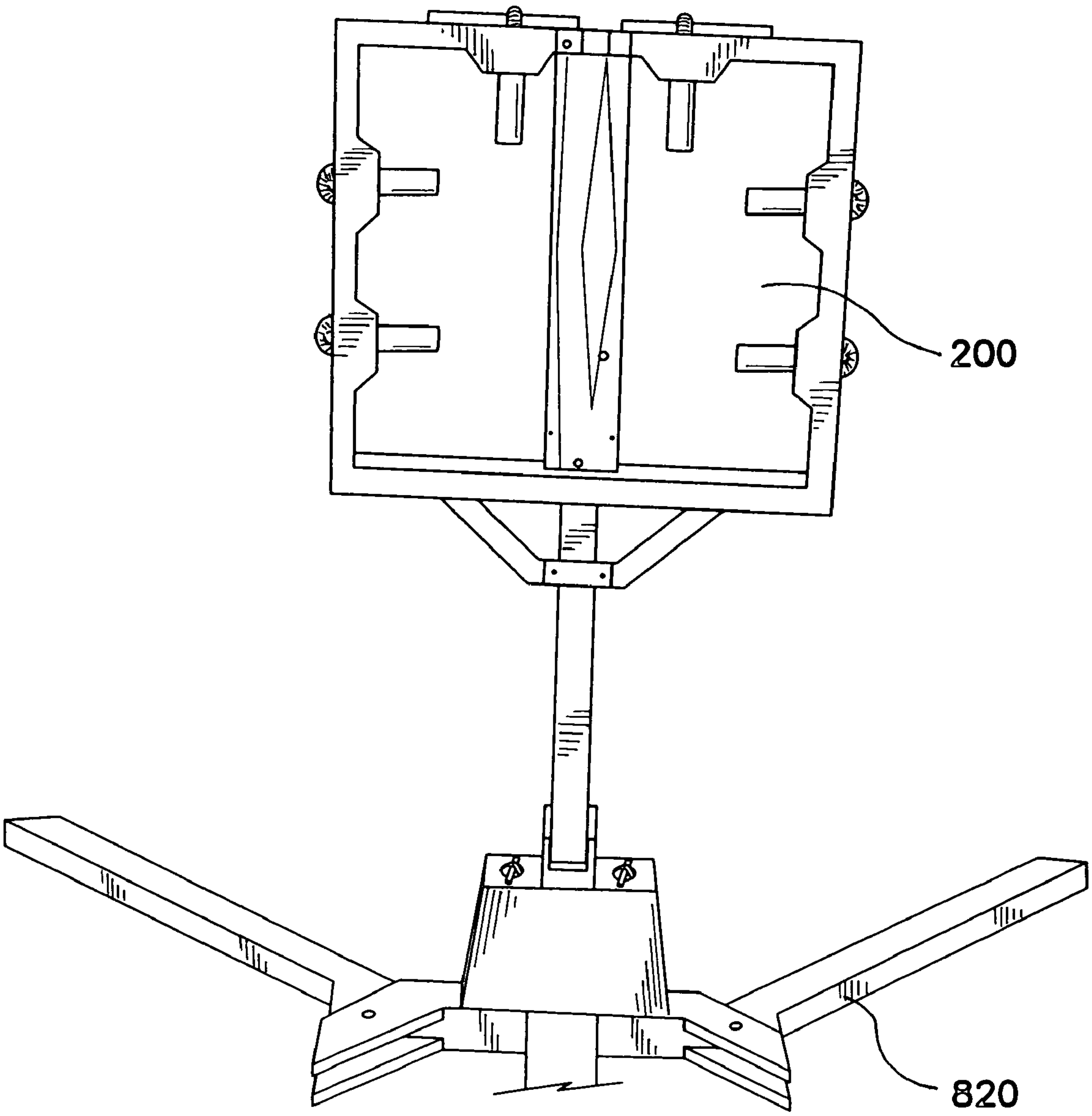
FIG. 6 is a rear view similar to FIGS. 4 and 5, wherein the sign has been fully folded up into its stowable configuration.
Figure 7:
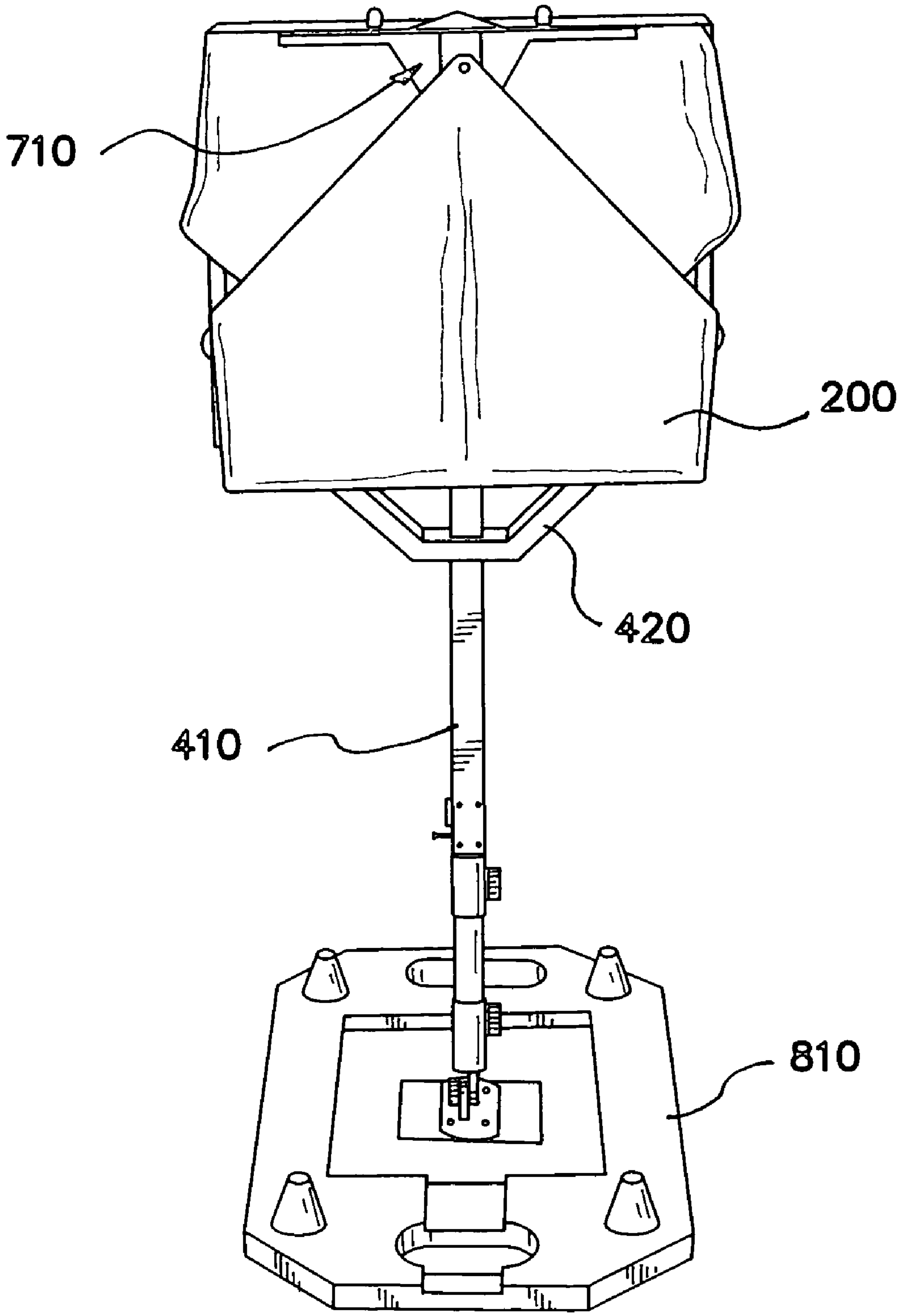
FIG. 7 is a rear view similar to FIG. 6, showing a fastener for securing the sign in the stowable configuration.

FIG. 6 shows the sign of the present invention in a completely folded configuration, suitable for storage or transport. As shown in FIG. 7, a suitable fastener 710, which may comprise, for example, a button or latch, or the like, may be used to hold the folded sign in its stowable configuration. To deploy the sign, it may simply be released by hand, by merely undoing the fastener 710, or it may be released in a more automated fashion as will be described in alternative inventive embodiments below.

Figure 8:
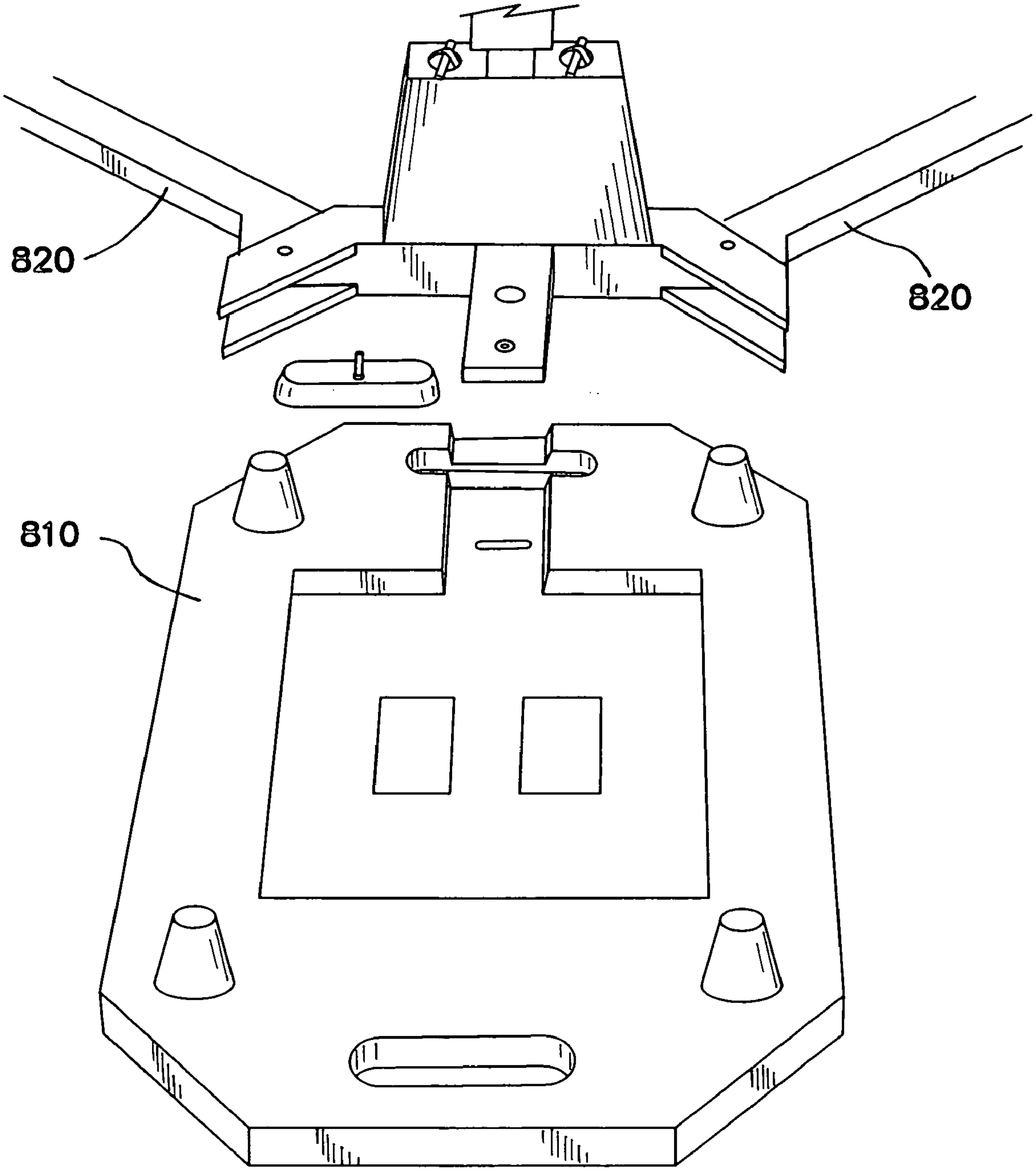
FIG. 8 is a view which illustrates a base having foldable legs removably attached to the base, in accordance with the principles of the present invention.

In another alternative inventive embodiment, there is shown in FIG. 8 a pre-assembled traffic sign having a base 810 with foldable legs 820 that may be removably attached to the base 810. An example of a base that is useful for this purpose is one described in U.S. Pat. No. 5,732,911, herein already expressly incorporated by reference above. However, as those ordinarily skilled will realize, the traffic sign of the present invention is not limited to any particular base, as any type of base providing stability to the sign while being deployed and when fully deployed is suitable, depending upon preference and application.

Figure 9:
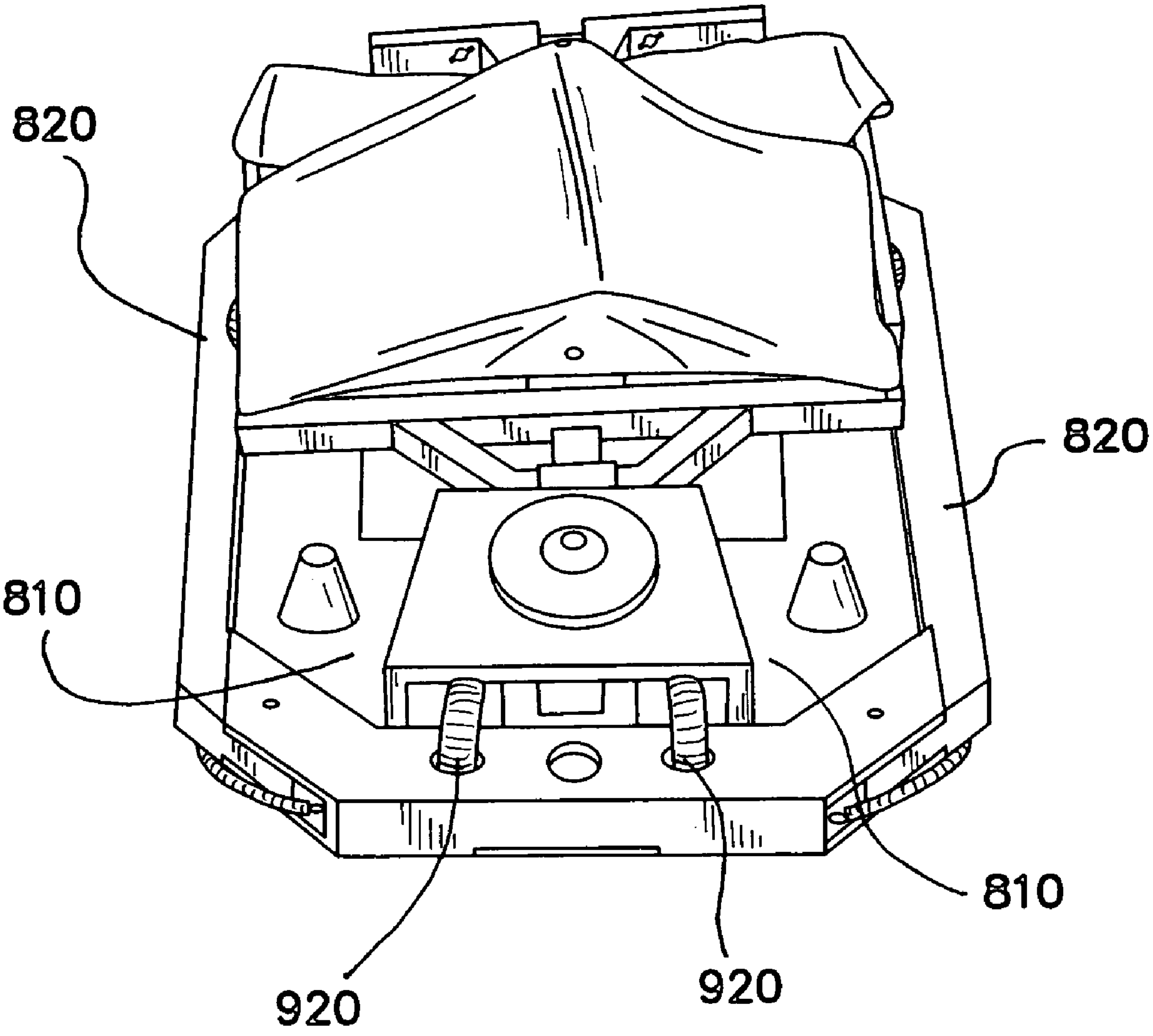
FIG. 9 is a view which illustrates the base of FIG. 8, wherein the legs are in a folded position for storage or transport.
Figure 10:
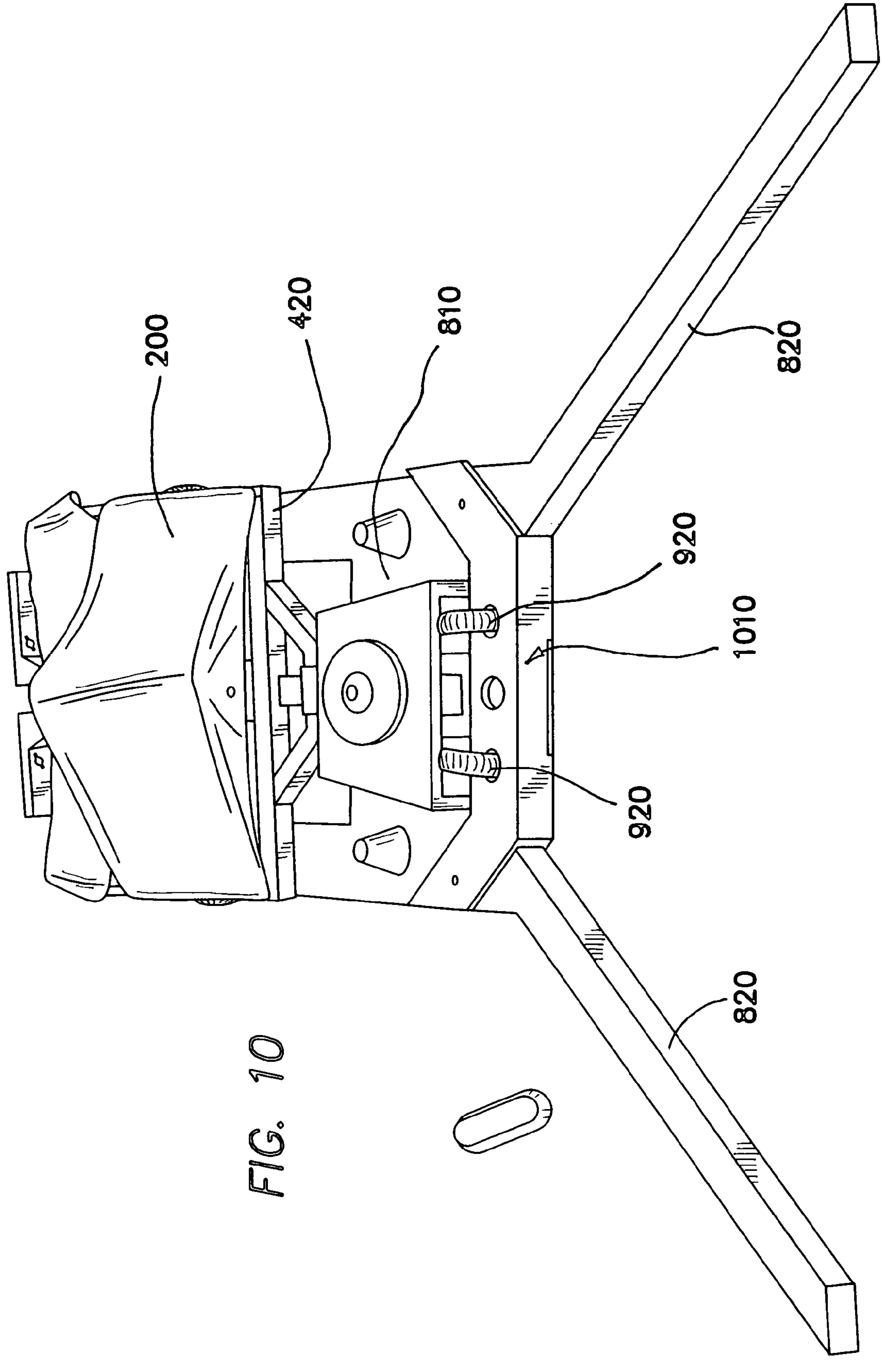
FIG. 10 is a view similar to FIG. 9, wherein the legs are held in an unfolded configuration.

FIG. 9 illustrates the base 810 of FIG. 8, with the foldable legs 820 attached thereto in a folded configuration. As shown, the legs 820 fit snugly along the length of the base in their folded configuration. As shown in FIG. 10, leg support member 1010 fits snugly along a bottom edge of the base 810. This member 1010 functions to hold the legs 820 in place when in their unfolded configuration, as shown.

Figure 11:
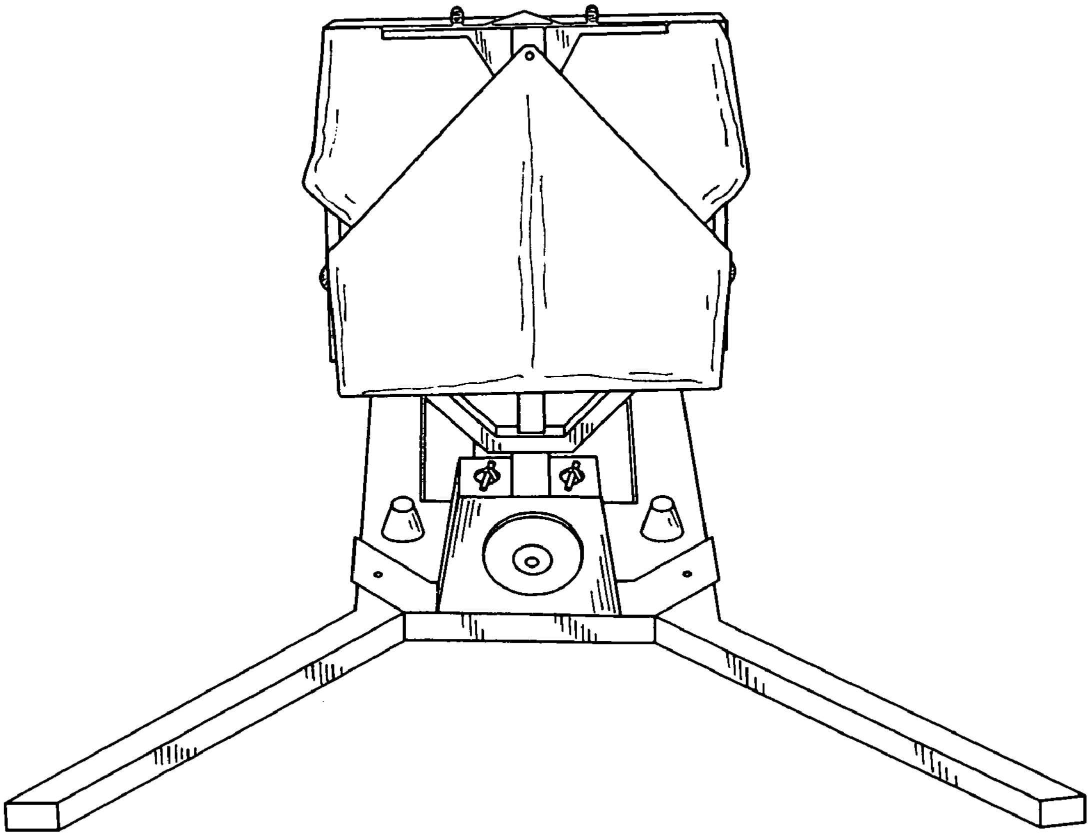
FIG. 11 is a view similar to FIG. 10, wherein the foldable legs have been extended for the purpose of deploying the sign.

The deployment of the traffic sign 200 with or without foldable legs works in a similar fashion. In both cases, the entire sign is in a folded position for storage or transport (see FIG. 1A-110 for the embodiment without foldable legs, and FIG. 9 for the embodiment with foldable legs). The deployable sign is stored in its stowed (spring-loaded compact) configuration either in a recessed area of the support base or on top of the support base. First, the deployable sign as a whole is spring-loaded in this stored configuration by means of a pivotal connection, such as that afforded by springs 920 (FIG. 9). Other suitable known pivotable connections can, of course, be used as well. Second, the flexible arms holding the sign are preferably spring-loaded and foldable in a compact manner. This spring-loaded foldable orientation may be maintained simply by having the traffic sign disposed in stored position inside a receptacle (recess) by an interference fit or retaining cover, or by means of a latching mechanism or other suitable holding means. The latch may be designed to be automatically released when the traffic sign is released from the receptacle. Once the stored traffic sign is released from the receptacle, the deployable sign automatically rises from its stored horizontal orientation to its deployed erect orientation, as shown in FIG. 11. If foldable legs are employed, they are preferably designed to pop out when released.

Figure 12:
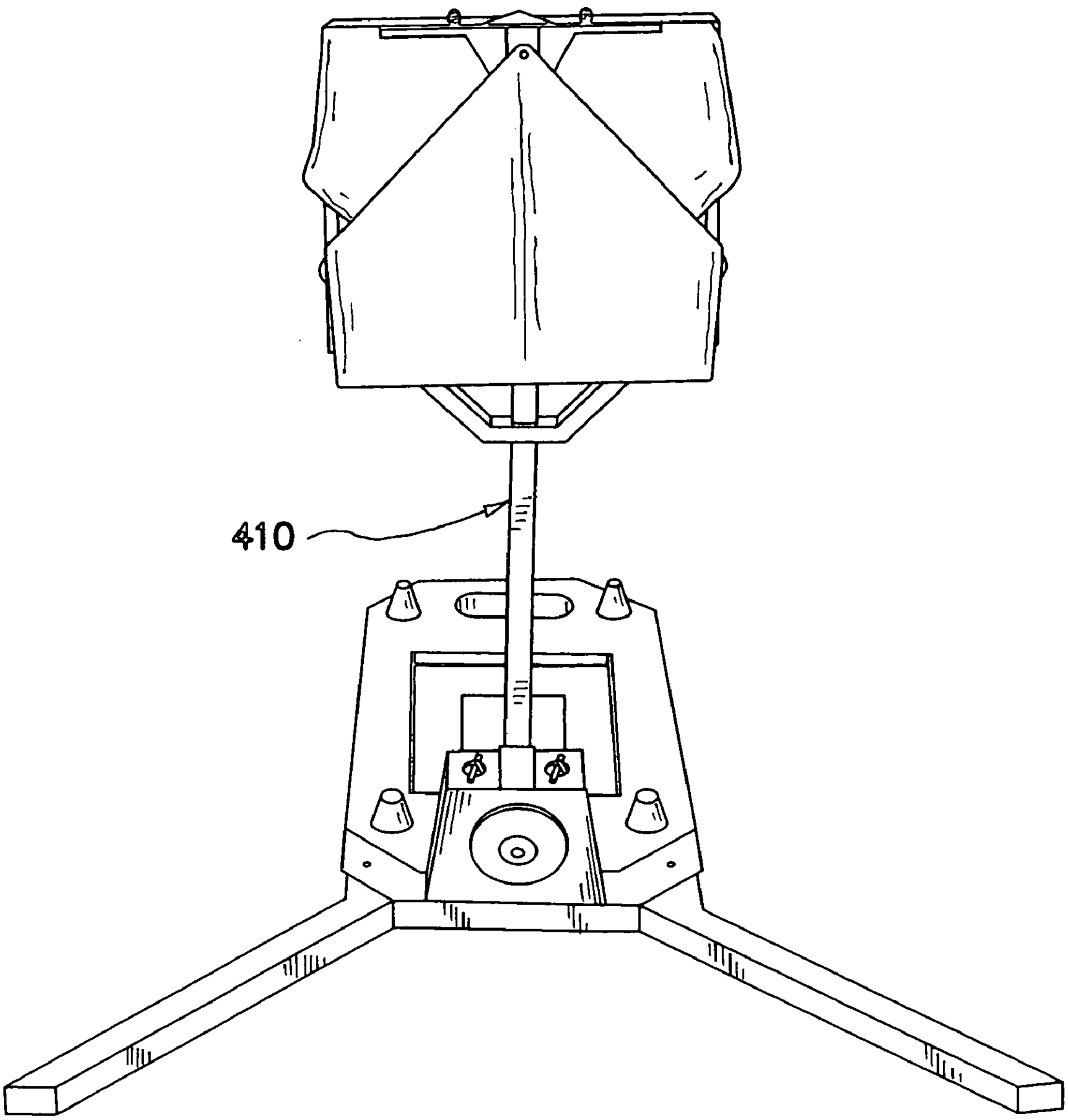
FIG. 12 is a view similar to FIG. 11, wherein the sign has deployed to an upright configuration.

During or after the deployment process, the flexible arms open up to a fully extended frame, in a reverse order from that by which they were folded into the stowable configuration. The sign opens up in an automatic fashion and is accomplished by the spring mechanism of the flexible arms or when a holding means is released in manual fashion. In one embodiment, also during or after this process, the mast 410 extends and pushes the sign up, as shown in FIG. 12.

Figure 13A:
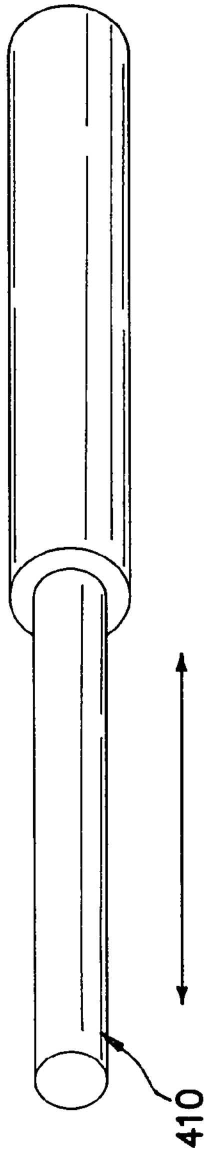
FIG. 13A is a view of one embodiment of a mast for supporting the sign of the present invention, in its extended configuration.
Figure 13B:
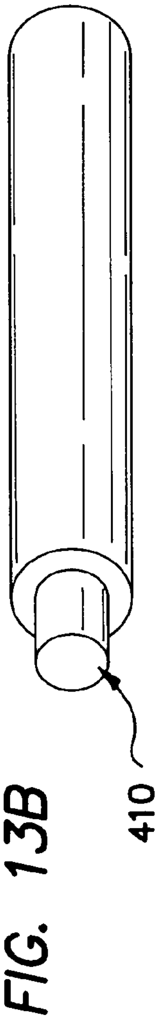
FIG. 13B is a view similar to FIG. 13A, showing the mast in its stored or retracted configuration.
Figure 13C:
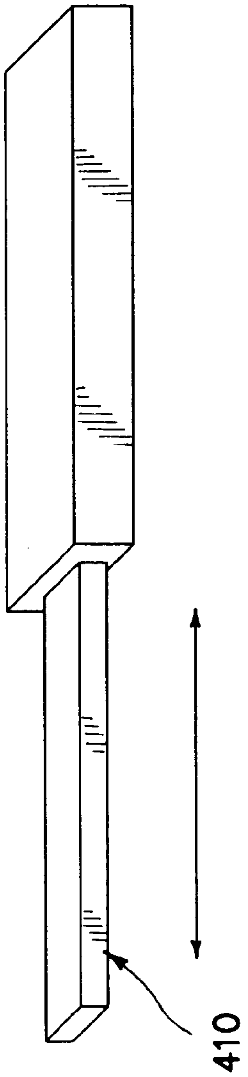
FIG. 13C is a view of a second embodiment of a mast for supporting the sign of the present invention, in its extended configuration.
Figure 13D:
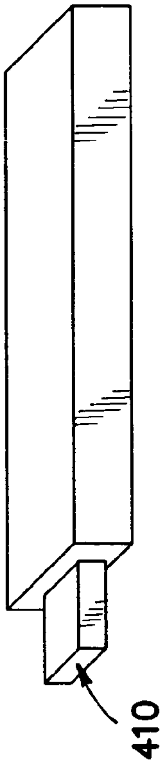
FIG. 13D is a view similar to FIG. 13C, showing the mast in its stored or retracted configuration.

FIGS. 13A and 13B illustrate one embodiment of a telescoping cylindrical mast 1310, which may be used for the present invention, in both its extended (FIG. 13A) and retracted (FIG. 13B) orientations. FIGS. 13C and 13D are similar to FIGS. 13A and 13B, respectively, except they depict a rectangular telescoping mast 410. Of course, many other configurations are possible, as well. The telescoping mast 410 may be a spring-like, piston-like, or hydraulically actuated system, as desired.

A feature of the present invention is that the deployment process may be accomplished in a variety of ways, which are all a part of the invention. For example, the folded (and/or retracted) parts may all unfold or extend at the same time. Or, alternatively, they may fold or extend in a sequential pattern.

Figure 14A:
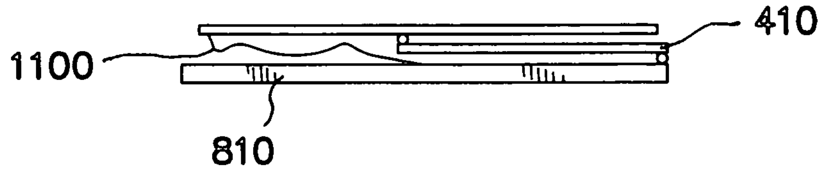
FIG. 14A is a view of another embodiment of a traffic sign constructed in accordance with the principles of the present invention, having a fixed length mast, and shown in a stowed configuration.
Figure 14B:
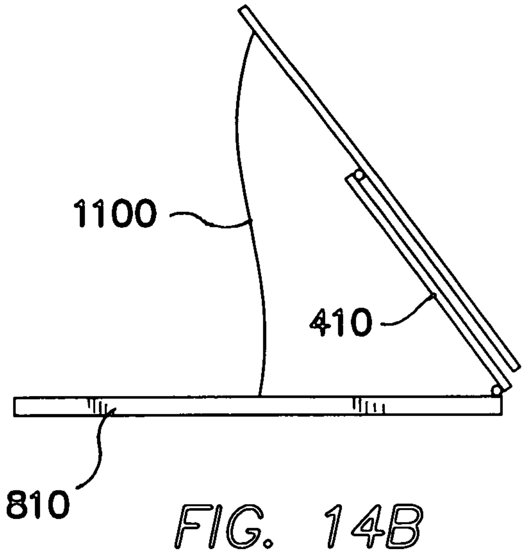
FIG. 14B is a view similar to FIG. 14A, wherein the sign is in the process of being deployed.
Figure 14C:
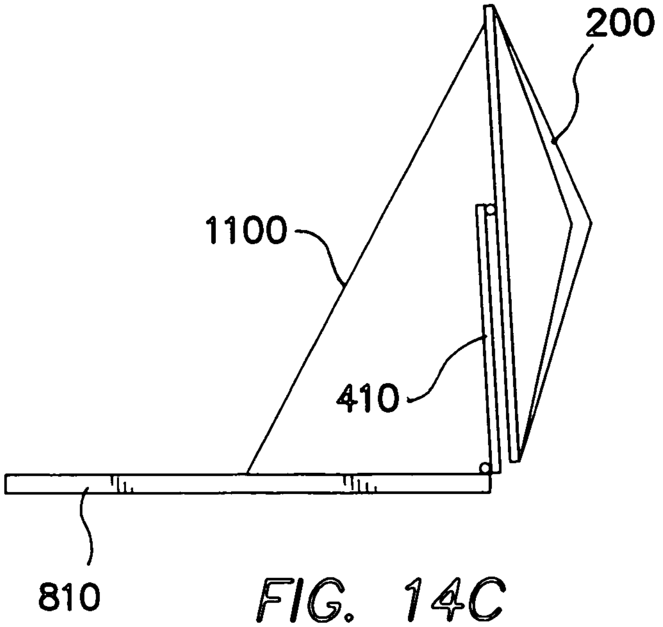
FIG. 14C is a view similar to FIG. 14B, wherein the sign has been deployed.

FIGS. 14A-14C depicts an example of a traffic sign having a mast 410 of fixed length, wherein the unfolding process of the sign itself is triggered by the angular displacement of the mast 410 with respect to the base 810. To illustrate this concept, a wire 1100 is shown, attached to the base and in slack position when the mast is in a stored orientation (FIG. 14A). When the mast is deployed (FIG. 14B) toward the unfolded orientation, the slack on the wire 1100 begins to disappear, and will pull the holding means for the sign as shown, so that the sign can unfold.

Figure 15A:
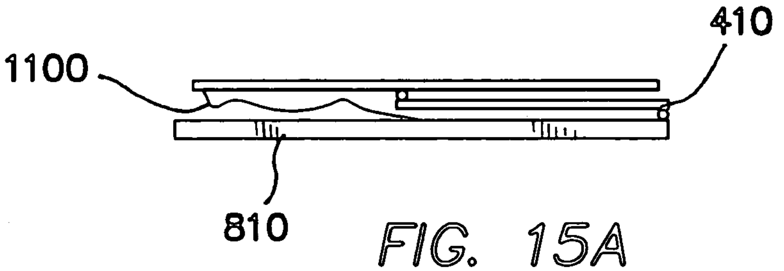
FIG. 15A is a view similar to FIG. 14A of another embodiment of a traffic sign constructed in accordance with the principles of the present invention, having a variable length mast and shown in a stowed configuration.
Figure 15B:
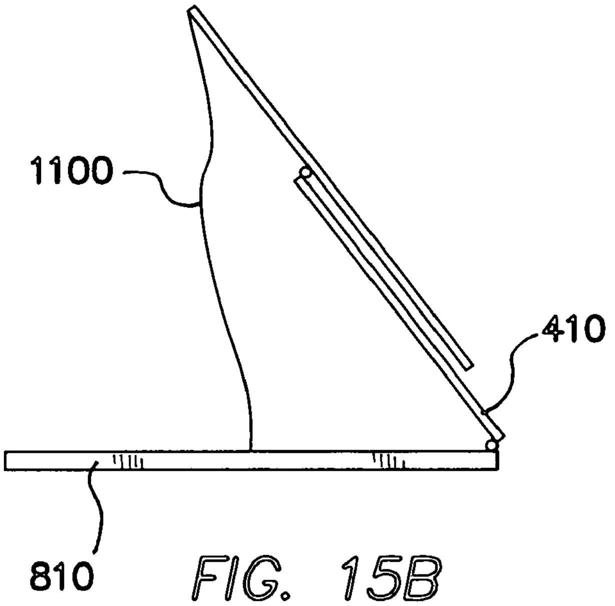
FIG. 15B is a view similar to FIG. 15A, wherein the sign is in the process of being deployed.
Figure 15C:
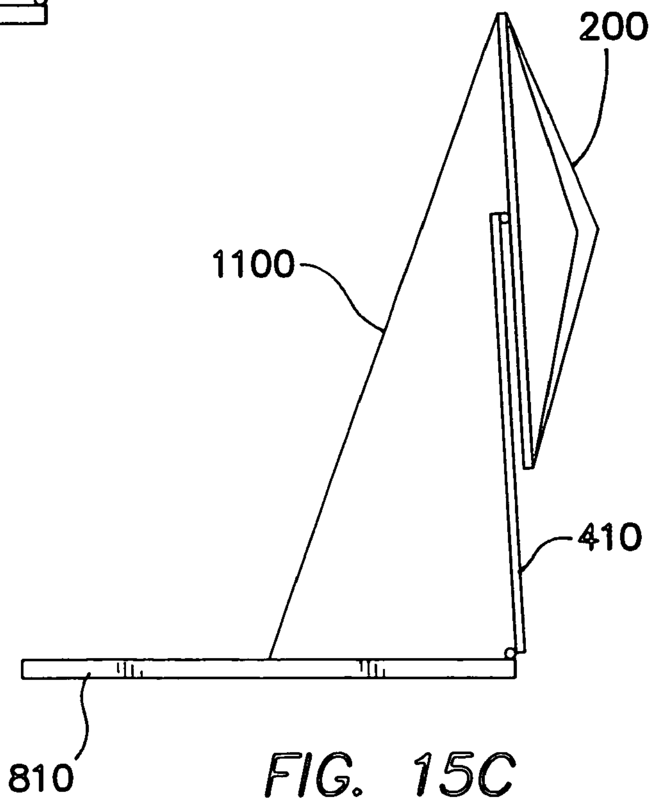
FIG. 15C is a view similar to FIG. 15B, wherein the sign has been deployed.

FIGS. 15A-15C illustrate an alternative example, wherein the mast is of a telescoping adjustable height type, and wherein the unfolding process of the sign itself is triggered by the angular displacement of the signpost with respect to the base, as well as the extension of the mast 410.

Figure 16A:
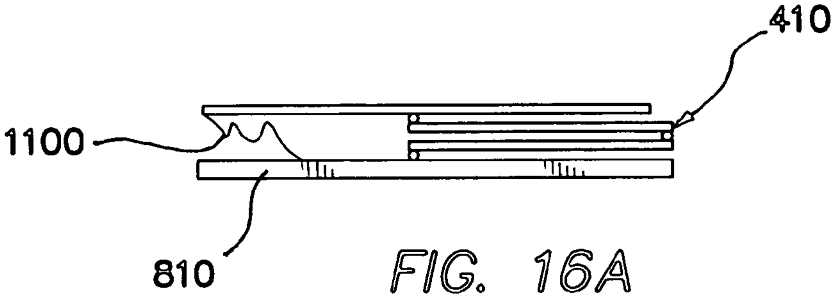
FIG. 16A is a view similar to FIG. 15A of another embodiment of a traffic sign constructed in accordance with the principles of the present invention, utilizing a different mechanism for a sign mast herein foldable elements are used instead of the extendable elements used in FIG. 15A, shown in a stowed configuration.
Figure 16B:
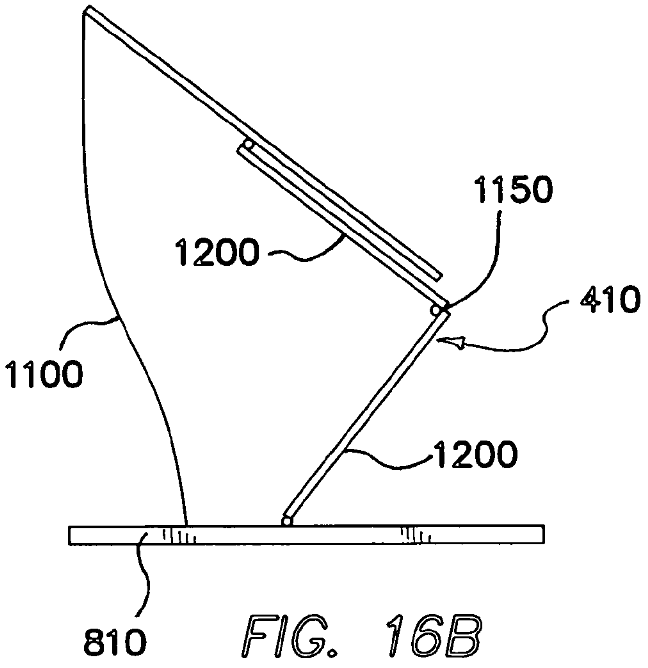
FIG. 16B is a view similar to FIG. 16A, wherein the sign is in the process of being deployed.
Figure 16C:
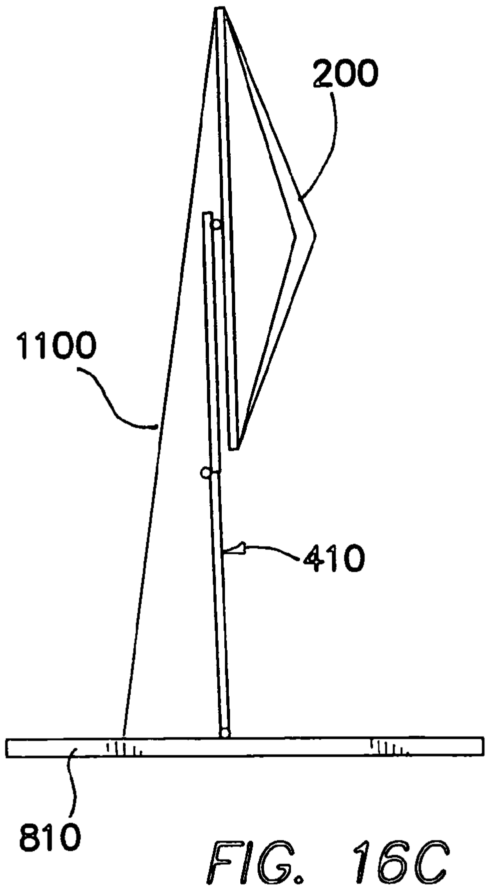
FIG. 16C is a view similar to FIG. 16B, wherein the sign has been deployed.

FIGS. 16A-16C illustrate still another alternative embodiment, wherein the mast is foldable, rather than extendable. These foldable elements of the mast may be manually pulled up to create the erect mast, in which case it is preferred to have self-lockable joints 1150 between mast sections 1200, that can keep the mast in its erect orientation, and also be easily unlocked by a user once the sign needs to be configured into its compact stowable orientation. Examples of such systems are common in the mechanical arts. These mast portions may also be automatically extended with spring mechanisms, hydraulics, or the like, which are also common in the mechanical arts.

Figure 17C:
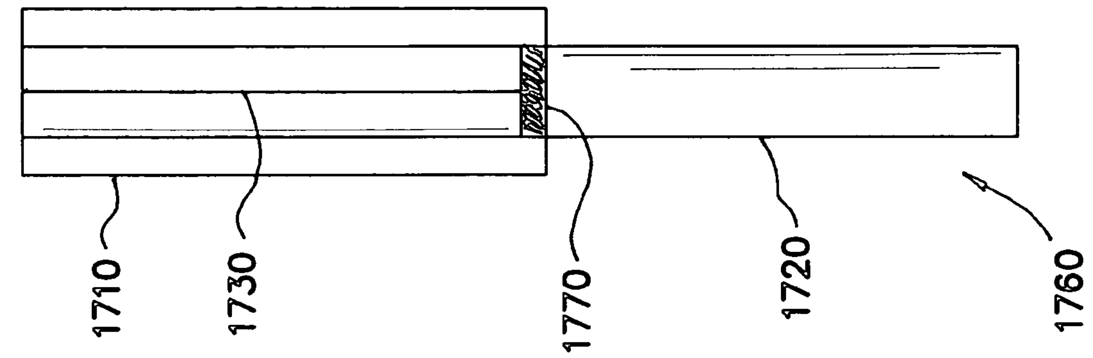
FIG. 17C is a view similar to FIG. 17B, wherein the mast has been fully extended.
Figure 17B:
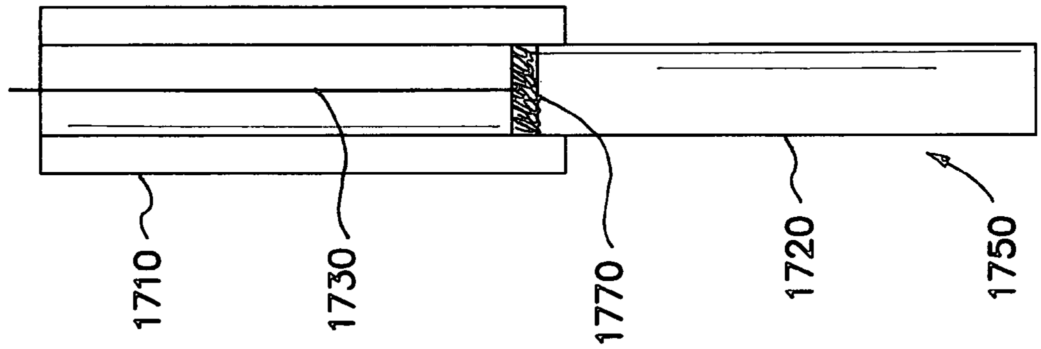
FIG. 17B is a view similar to FIG. 17B wherein the mast has been partially extended.
Figure 17A:
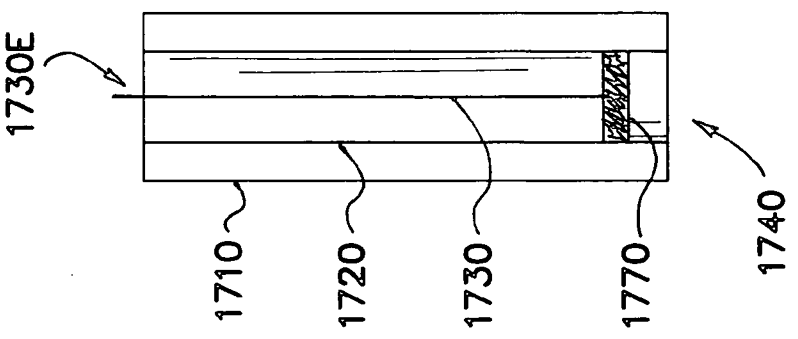
FIG. 17A is a view of another embodiment of the present invention which comprises a mechanism for automatically releasing the folded sign by movement of a mast, wherein the mast is shown in a stowed configuration.

FIGS. 17A-17C illustrate an example of a mechanism that automatically releases the folded sign by movement of the mast. More specifically, the mast in this embodiment comprises two members 1710, 1720 which are slidably connected. In addition, a rod 1730, for example, may be included and the end of the rod 1730E may be used as a support for the sign (not shown). When the mast is in retracted orientation 1740 (FIG. 17A), then the rod 1730E protrudes from the member 1710, which may be used to hold one of the flaps of the sign and to keep the sign in a folded orientation. Then, when the deployment process takes place, as shown in FIG. 17B (reference numeral 1750), member 1720 slides out from member 1710. In the fully deployed orientation 1760 (FIG. 17C), a stopper 1750, which is connected to the rod 1730, gets pulled by the member 1720 and pulls the end of the rod 1730E through and inside member 1710. By this action, the folded sign gets released and unfolds.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A traffic sign system, comprising:

a sign comprising a flexible panel having a first larger size when deployed and having a second smaller size when not deployed;

a mast for supporting said sign; and a base for supporting said mast;

said flexible panel comprising four folding lines thereon for transforming the sign from its first larger size to its second smaller size, said folding lines comprising creases;

said flexible panel being diamond-shaped in its first larger size and said folding lines being arranged generally in a square so that each corner of said diamond-shaped flexible panel may be folded over a center portion of the panel, such that the panel is generally square in its second smaller size.

2. The traffic sign system as recited in claim 1, wherein said crease is heat welded.

3. The traffic sign system as recited in claim 1, wherein at least two of said folding lines intersect one another.

4. The traffic sign system as recited in claim 1, wherein the flexible panel is diamond shaped in its first larger size, when vertically oriented, and square-shaped in its second smaller size, when vertically oriented.

5. The traffic sign system as recited in claim 1, and further comprising a fastener for securing the sign in its second smaller size.

6. The traffic sign system as recited in claim 1, wherein said mast is fixed in length.

7. The traffic sign system as recited in claim 1, wherein said mast comprises two telescopically arranged members, so that it is adjustable in length.

8. The traffic sign system as recited in claim 1, wherein said mast comprises a plurality of segments which are pivotally secured to one another.

9. The traffic sign system as recited in claim 1, wherein said mast is pivotally attached to said base.

10. A traffic sign, comprising:

a flexible panel having a first larger size when deployed and having a second smaller size when not deployed, said flexible panel being adapted for display on a sign stand;

said flexible panel comprising four folding lines thereon for transforming the sign from its first larger size to its second smaller size, wherein said folding lines comprises creases;

said flexible panel being diamond-shaped in its first larger size and said folding lines being arranged generally in a square so that each corner of said diamond-shaped flexible panel may be folded over a center portion of the panel, such that the panel is generally square in its second smaller size.

11. The traffic sign system as recited in claim 10, wherein said crease is heat welded.

12. The traffic sign system as recited in claim 10, wherein at least two of said folding lines intersect one another.

13. The traffic sign system as recited in claim 10, wherein the flexible panel is diamond shaped in its first larger size, when vertically oriented, and square-shaped in its second smaller size, when vertically oriented.

14. The traffic sign system as recited in claim 10, and further comprising a fastener for securing the sign in its second smaller size.

15. A traffic sign system, comprising:

a sign comprising a flexible panel having a first larger size when deployed and having a second smaller size when not deployed, said flexible panel being diamond-shaped when it is configured in said first larger size;

a mast for supporting said sign; and a base for supporting said mast;

said flexible panel comprising four folding lines thereon, so that a portion of the flexible panel may be folded upon another portion of the flexible panel, about one of said folding lines, for transforming the sign from its first larger size to its second smaller size; said folding lines being arranged generally in a square so that each corner of said diamond-shaped flexible panel may be folded over a center portion of the panel, such that the panel is generally square in its second smaller size.

16. A traffic sign, comprising:

a flexible panel having a first larger size when deployed and having a second smaller size when not deployed, said flexible panel being adapted for display on a sign stand and being diamond-shaped in said first larger size;

said flexible panel comprising four folding lines thereon, so that a portion of the flexible panel may be folded upon another portion of the flexible panel, about one of said folding lines, for transforming the sign from its first larger size to its second smaller size, said folding lines being arranged generally in a square so that each corner of said diamond-shaped flexible panel may be folded over a center portion of the panel, such that the panel is generally square in its second smaller size.

* * * * *